United States Patent [19]

Falk et al.

[11] Patent Number: 4,489,315
[45] Date of Patent: Dec. 18, 1984

[54] PERSONNEL ELECTRONIC NEUTRON DOSIMETER

[75] Inventors: Roger B. Falk, Lafayette; William H. Tyree, Boulder, both of Colo.

[73] Assignee: The United States of America as represented by the United States Department of Energy, Washington, D.C.

[21] Appl. No.: 354,419

[22] Filed: Mar. 3, 1982

[51] Int. Cl.³ .................. G01T 3/12; G08B 17/12
[52] U.S. Cl. .................. 340/600; 250/370; 250/392
[58] Field of Search ......... 340/600; 250/390, 392, 250/370 F

[56] References Cited

U.S. PATENT DOCUMENTS

| | | | |
|---|---|---|---|
| 4,320,393 | 3/1982 | Engdahl | 340/600 |
| 4,381,454 | 4/1983 | Griffith et al. | 250/390 |
| 4,383,179 | 5/1983 | Eisen et al. | 250/390 X |
| 4,419,578 | 12/1983 | Kress | 250/390 |
| 4,445,036 | 4/1984 | Selph | 250/390 |

*Primary Examiner*—James J. Gill
*Attorney, Agent, or Firm*—George H. Libman; Albert Sopp

[57] ABSTRACT

A personnel electronic dosimeter includes a neutron-proton and neutron-alpha converter for providing an electrical signal having a magnitude proportional to the energy of a detected proton or alpha particle produced from the converter, a pulse generator circuit for generating a pulse having a duration controlled by the weighed effect of the amplitude of the electrical signal, an oscillator enabled by the pulse for generating a train of clock pulses for a time dependent upon the pulse length, a counter for counting the clock pulses, and an indicator for providing a direct reading and aural alarm when the count indicates that the wearer has been exposed to a selected level of neutron dose equivalent.

4 Claims, 3 Drawing Figures

PERSONNEL ELECTRONIC NEUTRON DOSIMETER

The United States Government has rights in this invention pursuant to Contract No. DE-AC04-76DP03533 between the Department of Energy and Rockwell International Corporation.

BACKGROUND OF THE INVENTION

The present invention relates generally to a personnel neutron dosimeter and more particularly, to a portable dosimeter capable of providing both an immediate indication of the neutron dose equivalent received by the person wearing the dosimeter and an alarm when that dose equivalent exceeds a selectable preset level.

Protection of workers in a radioactive environment requires an accurate and timely monitoring of the radiation dose equivalent received by each worker. Monitoring dose equivalents received for neutron exposures must take into account not only the radiation quantity but also the radiation quality. Unlike x, gamma, or beta radiations for which the hazards are substantially the same per unit of absorbed dose for the commonly encountered energies, neutron radiation can result in a hazard which increases with both increased unit absorbed dose and neutron energy. For a device to measure accurately the neutron dose equivalent received by a person exposed to unknown or varying spectra of neutron energies, the device not only should count the neutron events but also should compensate properly for the variability in hazard as a function of the neutron energy. To monitor the dose equivalent in a timely manner, the device should indicate the accumulated dose equivalent at any desired time and provide a warning when the accumulated dose equivalent reaches a chosen action level.

Several devices are commonly used to measure neutron dose equivalents received by personnel in radioactive environments. One such device is a badge containing neutron sensitive film as the measurement medium. Neutrons impinging on the film may strike a hydrogen atom in the film emulsion. This hydrogen atom is ionized into a proton, which then causes an ionization recoil track in the emulsion. Development of the film forms an image of the proton recoil track which may be visually detected. Evaluation of the accumulated dose equivalent received by the person wearing the badge can be made by counting the proton recoil tracks on the film, usually manually with the aid of a microscope.

Another commonly used device is a badge containing thermoluminescent dosimeters (TLD) as the measurement medium. These TLD are crystalline materials, usually containing the isotopes lithium-6 or boron-10, and have the property of luminescing when they are heated to a high temperature if they had previously been exposed to radiation. Both lithium-6 and boron-10 have a significant cross-section for the $(n,\alpha)$ reaction, whereby the alpha causes ionization in the crystal, imparting energy to the electrons. A portion of these electrons are trapped until the crystal is heated to a temperature sufficient to release them. The release of a trapped electron is accompanied by a flash of light (luminescence). The neutron dose equivalent is then evaluated from measurement of the light output when the TLD are evaluated by heating.

Other devices have been developed for use as personnel neutron dosimeters, including badges that contain fission track etch foils, proton recoil etch foils, or combinations of track etch foils and TLD, as the measurement medium.

These devices suffer, in various degrees, a disadvantage in that they do not measure accurately the dose equivalent received by a person exposed to unknown or varying spectra of neutron energies; i.e., the response of the device does not adequately indicate the neutron dose equivalent for all commonly encountered energies or spectra of neutrons. For example, the neutron film and proton-recoil track etch dosimeters are not sensitive to neutrons with energies less than approximately 200 keV. TLD are preferentially sensitive to thermal and low energy neutrons. Fission track etch dosimeters are sensitive only to neutrons with energies at which the fission cross-section is significant. Combinations of track etch dosimeters and TLD utilize the high energy response of the track etch dosimeter and the low energy response of the TLD to ameliorate the degree of this disadvantage.

All these devices suffer a major disadvantage in that they do not provide a direct readout of the accumulated dose equivalent in a timely manner; that is, the badge must be removed from the wearer and be developed before a reading is provided. Similarly, no alarm is provided to alert the wearer that his accumulated neutron dose equivalent has reached an action level. Accordingly, the wearer may be advised, after the fact, that he has been exposed to an excessive level of neutron radiation, but he is not warned at the time of exposure that he must take additional measures to protect himself.

One particular attempt to provide a portable, direct reading, neutron counter is described in an article entitled, "A Pocket-Sized Integrating Neutron Counter" by the present inventors and Valens P. Johnson, Rocky Flats publication RFP-794, Jan. 22, 1971. The detector described in this article used a lithium-6 foil mounted on a cadmium foil. The output of the detector was amplified and fed into a mono-stable multivibrator to provide an output pulse to drive a current amplifier. The output of the amplifier was then used to cause a small quantity of mercury to transfer across an electrolytefilled gap between mercury columns in a capillary tube of a microcoulometer, causing a displacement of the position of the gap. The net displacement of this gap was proportional to the number of neutron events detected, providing a visible indication of the number of pulses accumulated.

Tests of this counter showed that the sensitivity of the counter increased as the average neutron energy decreased, thereby providing a misleading increase in count rate when receiving less dangerous radiation. In addition, the counter showed a reading of approximately 1.4 mrem per day from background and gamma response. And most significantly, the device proved to be very sensitive to mechanical shocks which caused a displacement of the gap in the mercury column, thereby destroying the measurement of accumulated neutron dose.

SUMMARY OF THE INVENTION

It is an object of this invention to provide a personnel neutron dosimeter with a direct readout.

It is also an object of this invention to provide a personnel neutron dosimeter with discrimination between high and low energy neutrons.

It is another object of this invention to provide a rugged portable neutron dosimeter.

It is a further object of this invention to provide a personnel neutron dosimeter with more than one level of discrimination among pulses from charged particles generated by incident neutrons.

It is a still further object of this invention to provide a rugged personnel neutron dosimeter, with selectable alarm levels, aural alarm when a selected level is reached, and an audio disable.

Additional objects, advantages and novel features of the invention will become apparent to those skilled in the art upon examination of the following description or may be learned by the practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the personnel neutron dosimeter of this invention may comprise a neutron detector for providing an electrical signal in response to secondary reactions caused by impinging neutrons, a pulse generator for generating a pulse having a duration controlled by the amplitude of each electrical signal, an oscillator for generating high frequency clock pulses to provide a dose equivalent representation, and an indicator circuit for providing a direct indication of accumulated radiation.

BRIEF DESCRIPTION OF THE DRAWINGS

The accompanying drawings, which are incorporated in and form a part of the specification, illustrate an embodiment of the present invention and, together with the description, serve to explain the principles of the invention.

DETAILED DESCRIPTION OF THE INVENTION

Figure 1:
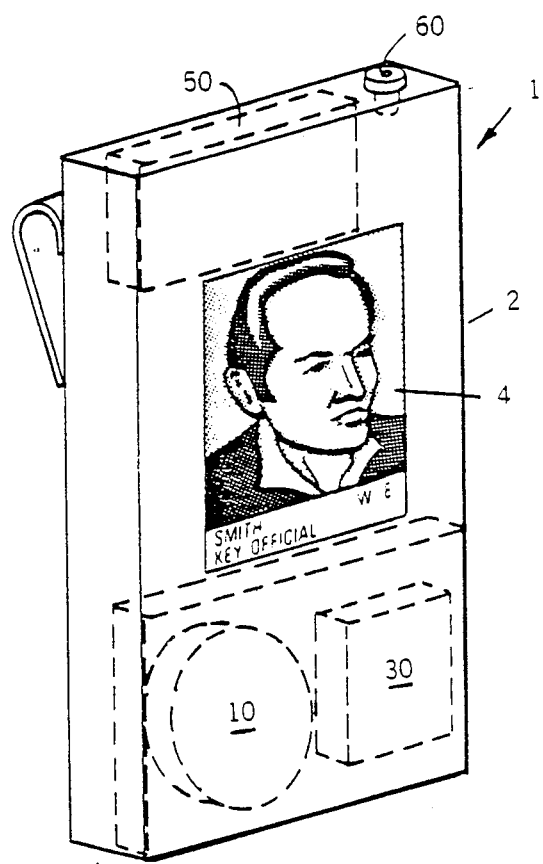
FIG. 1 shows the invention incorporated into a personnel dosimetry badge.
Figure 2:
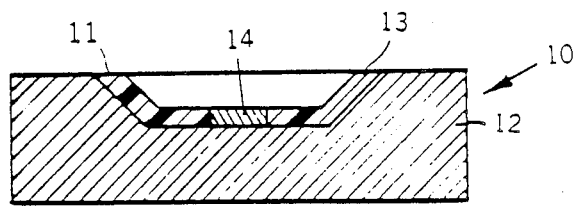
FIG. 2 is a cross-sectional view of the detector.
Figure 3:
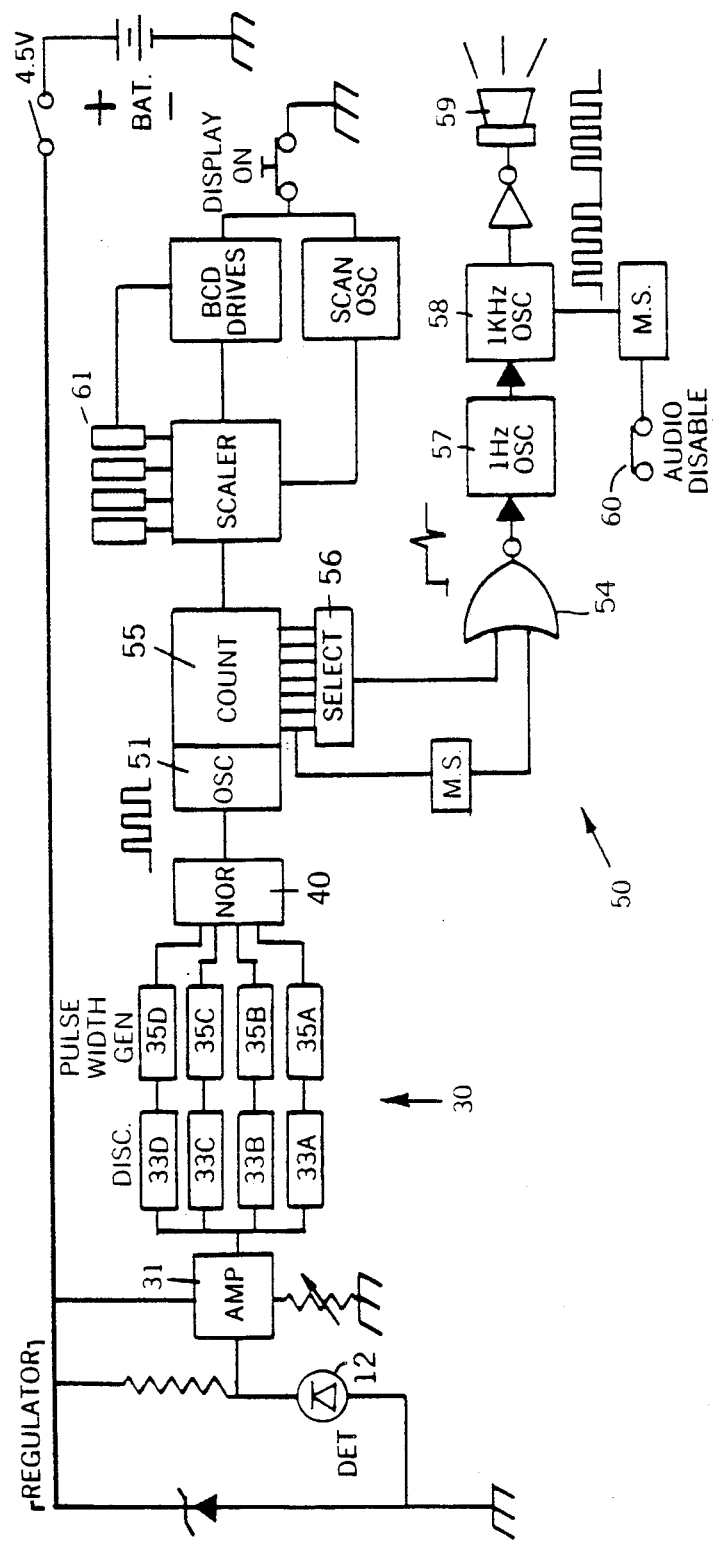
FIG. 3 is a block diagram of the invention.

As shown in the figures, dosimeter 1 includes case 2 containing detector 10, electronic circuitry 30, and indicator 50. The invention is preferably packaged as a personnel dosimetry badge, which includes means, such as fastening clip 3, for attaching the badge to the wearer.

An uncharged particle like a neutron does not normally produce a detectable reaction in a surface barrier detector. Therefore, neutron detection must be accomplished by a secondary conversion process that produces charged particles. Two types of conversion processes which provide information about impinging neutron fields are the neutron-proton reaction and the neutron-alpha reaction.

A different converter is required to implement each of these reactions. One requires hydrogenous materials for a neutron-proton reaction, the other requires a material which produces an exoergic reaction (a reaction which liberates energy). Although several exoergic materials are naturally available, lithium-6 was chosen because it produces an alpha particle with high reaction energy and good cross section at very low neutron energies. Both lithium-6 and hydrogenous materials are commercially available.

Proton recoils contribute the majority of the neutron dose equivalent received by a person for neutrons with energies from $10^{-5}$ to greater than 10 MeV. However, protons with energies less than approximately 0.2 MeV do not generate a pulse of sufficient magnitude in the surface barrier detector to allow the pulse to be distinguished from pulses from photons or electronic noise. Therefore, pulses from the (n,α) reaction in lithium-6 are used to detect neutrons with energies less than approximately 0.2 MeV. This conversion process produces a high energy alpha particle that is easily detected in a silicon surface barrier detector.

A preferred embodiment of detector 10 includes converter materials 11 mounted on the front surface of case 2 and underlying surface barrier detector 12. Converter materials 11 comprise a hydrogenous material 13 such as polystyrene or polyethylene and a material 14 containing lithium-6 such as a chip of lithium fluoride. Neutrons impinging these materials generate elastic scattered recoil protons if they interact with the hydrogen or alpha particles if they react with the lithium-6. The protons and alpha particles produce an electrical output from surface barrier detector 12, a commercially available device.

The electronic noise in the detector and associated electronics determine the ability to detect low amplitude current pulses from the detector. Therefore, parameters necessary for detection of low amplitude pulses may be downgraded in importance.

The quality factor which indicates the relative hazard from neutron radiation as a function of neutron energy is most significant for neutron energies greater than 0.1 MeV. This energy region is also the region for which the recoil protons are likely to produce detectable pulses in this device. However, the protons generated in the converter may be any energy from zero to the energy of the incident neutron. Also, a proton generated in the converter will be degraded in energy as a result of ionization in the material between the site of generation and the edge of the material adjacent to the surface barrier detector. This effect causes the energy spectrum of the protons impinging the surface barrier detector to be lower in energy than the spectrum of the protons initially generated. The degree of this energy degradation depends largely on the thickness of the converter material. A thickness less than 0.025 cm is desired to lessen this degradation, since protons degraded to less than approximately 0.2 MeV in energy will not produce a detectable pulse.

To produce an output in terms of the dose equivalent received by the person wearing this device, all of the above factors must be considered; that is, the probability of producing a charged particle as a function of the neutron energy, the quality factor as a function of neutron energy, and the spectrum of energies of the charged particles emerging from the converter material. This device accomplishes this output by providing a plurality of discriminator levels to sort the pulses based on their amplitude. Each group of pulses can then be weighted in a selectable manner to give the desired output in terms of dose equivalent.

In the illustrated embodiment, pulse circuitry 30 includes multi-stage current amplifier 31 connected to the output of detector 12, a plurality of discriminator circuits 33 and a plurality of pulse generators 35. Amplifier 31 is designed with a low input impedance to allow very low power operation of the amplifier with adequate signal to noise ratio, permitting the detection of small signals in the presence of detector noise. The amplifier includes several stages of gain and a low impedance output circuit to drive the relatively high impedance of each of the four parallel connected discriminator circuits 33A-33D. Connected to each discriminator circuit 33 is a monostable pulse generator 35. Each circuit serves as an amplitude discriminator whereby any one signal from the output of amplifier 31 will pass through only one circuit 33. In the preferred example, lowest detectable signals pass through only discriminator 33A and energize pulse generator 35A. Signals representative of neutrons energize levels above those which energize circuit 33A and below those which energize circuit 33C energize input circuit 33B and pulse generator 35B. Signals which result from the neutron-proton reaction and produce signals above the upper limit of circuit 33B will produce an output signal through circuit 33C and pulse generator 35C. Very high amplitude signals which originate from the lithium-6 conversion will trigger the fourth level and produce an output from circuit 33D and pulse generator 35D. Each of pulse generators 25A-25D is designed to provide a single pulse, when energized, of a duration representative of the total dose equivalent for that level.

For example, the pulse duration of generator 35B may be twice the duration of generator 35A and the duration of generator 35C may be five times the duration of generator 35A.

The output of each pulse generator is connected through appropriate buffer circuitry, such as NOR gate 40 to indicator circuitry 50. The input of indicator circuit 50 is high frequency oscillator 51, which provides a number of pulses each time oscillator 51 is gated on by one of pulse generators 35A-35D. Counter 55 is connected to the output of oscillator 51 to count the number of pulses generated by oscillator 51.

The basic operation of the invention is now apparent. Neutrons impinge upon materials 11, causing the emission of protons or alpha particles which are detected by surface barrier detector 12. For each detected neutron, detector 12 provides a single output pulse of amplitude proportional to the energy of the proton or alpha particle. This pulse passes through one of input circuits 33A-33D and energizes one of pulse generators 35A-35D. The energized pulse generator gates oscillator 51 on for a duration related to the quality factor of the detected neutron and the probability of generating a detectable proton or alpha particle. Counter 55 maintains a running total of counts provided by oscillator 51. This total is representative of the total neutron dose equivalent received by the person wearing the device. Binary switches 56 have been manually set to a desired control value. When the count registered in counter 55 exceeds the preset value of switches 56, a signal passes through NOR gate 54 to energize the alarm. A suitable alarm may include a visual or aural indication of the count. For example, one Hz oscillator 57 may be energized to repeatedly energize 1 KHz oscillator 58 and thereby provide a cyclical audible tone through loudspeaker 59, to warn the wearer that the control value has been reached. Disable switch 60 enables the wearer to silence this alarm. A running count of neutron dose equivalent may be provided by an LED or equivalent visual display of the count.

A prototype of this invention was constructed and tested for background radiation by observing the count over a 24-hour period both inside and outside a shielded room. For both runs, the background count was the same: 0.0375 counts per minute. The results of test indicate that this invention is not sensitive to gamma radiation.

The device was further tested for gamma sensitivity by exposing it at a distance of one inch to a $137_{Cs}$ source. The 114 millicurie gamma source did not produce any response in the output of the dose counter in 30 seconds.

The neutron response of the invention was tested by placing the device 100 centimeters from a source of $252_{Cf}$ and then changing the dose rate by putting successive amounts of moderating material between the source and the detector. For dose rates at the detector ranging from 19 mrem per hour for a bare source to 4.7 mrem per hour for neutrons passing through 9.5 centimeters of moderation, the counts per mrem ranged from 27 to 35. Another test was conducted with a PuBe neutron source placed 40 centimeters from the center of the detector. In this example, the count rate ranged from 51 counts per mrem from a bare source to 47 counts per mrem through 9.5 centimeters of moderation. It is believed that the discrepancy in counts per mrem can be eliminated by more accurate selection of the weighting values of the pulse generators.

For these tests, a device was constructed using polystyrene for the conversion material, a 100 mm$^2$ gold window surface barrier detector manufactured by Ortec, Inc., an IC amplifier, an LM339 voltage comparator and other commercially available electronic components.

The particular sizes and equipment discussed above are cited merely to illustrate a particular embodiment of the invention. It is contemplated that the use of this invention may involve components having different sensitivities and sizes as long as the principle described herein is followed. A dosimeter so constructed will provide a reliable, direct reading indication of the dose equivalent received by personnel wearing the device. It is intended that the scope of the invention be defined by the claims appended hereto.

We claim:

1. A personnel electronic neutron dosimeter capable of being carried on the clothing of a user comprising:
   neutron detector means for producing secondary reactions which generate an electrical signal;
   pulse generator means, connected to said detector, for generating a pulse, the duration of each pulse being controlled by the amplitude of each electrical signal;
   oscillator means, enabled by said pulse generator, for generating clock pulses, thereby providing a dose equivalent representation;
   counter means for counting the clock pulses; and
   indicator means for providing a direct indication of accumulated radiation.

2. The personnel dosimeter of claim 1 wherein said neutron detector comprises
   a mass of hydrogenous material for producing protons as a result of interactions with neutrons;
   a mass of an exoergic material to produce alpha particles from interactions with neutrons; and
   a surface barrier detector having a proton and alpha detecting surface mounted adjacent said masses.

3. The personnel dosimeter of claim 1 wherein said pulse generator comprises:
   a plurality of parallel connected discriminator circuits, each circuit passing electrical signals from said neutron detector which fall within a predetermined band of amplitude, the bands having upper and lower limits selected such that each signal passes through only one circuit, high amplitude signals pass through the circuit passing the highest signals and low amplitude signals pass through the circuit passing the lowest signals;

a plurality of pulse generators, each pulse generator being connected to the output of one discriminator circuit and providing, when actuated by an electrical signal passing through the discriminator, a single pulse of duration selected to give a representation of the total dose equivalent.

4. The personnel dosimeter for claim 1 wherein said indicator comprises:

an audible alarm;

counter means for storing the output of said oscillator means;

register means with selectable output for initiating said audio alarm in the event the selected value is reached or exceeded; and a digital display for recording the output of said counter.

* * * * *